United States Patent [19]
Khurana et al.

[11] Patent Number: 5,392,355
[45] Date of Patent: Feb. 21, 1995

[54] SECURE COMMUNICATION SYSTEM

[75] Inventors: Subash Khurana, Granada Hills, Calif.; Ronald H. Semler, 31727 Mulholland Hwy., Malibu, Calif. 90265

[73] Assignee: Ronald H. Semler, Malibu, Calif.

[21] Appl. No.: 142,622

[22] Filed: Oct. 25, 1993

[51] Int. Cl.$^6$ .......................... H04L 9/32; H04L 9/00
[52] U.S. Cl. ............................................ 380/23; 380/9; 380/48; 380/49; 340/825.31; 340/825.34; 379/58; 379/59; 379/95; 455/33.1; 455/53.1; 455/54.1
[58] Field of Search ................. 380/9, 23, 48, 49, 50; 340/825.31, 825.34; 379/58, 59, 61, 62, 95; 455/33.1, 53.1, 54.1, 54.2, 56.1

[56] References Cited

U.S. PATENT DOCUMENTS

| | | | |
|---|---|---|---|
| 4,897,875 | 1/1990 | Pollard et al. | 380/23 X |
| 5,077,790 | 12/1991 | D'Amico et al. | 380/23 |
| 5,153,919 | 10/1992 | Reeds, III et al. | 380/23 X |
| 5,282,250 | 1/1994 | Dent et al. | 380/23 |

Primary Examiner—Bernarr E. Gregory
Attorney, Agent, or Firm—Marvin H. Kleinberg

[57] ABSTRACT

A process for assuring secure communication over a radio link and apparatus to perform the process includes a scrambler-descrambler installed at a multiple line input multiple line output telephone switch. Individuals equipped with compatible scrambler-descramblers can place calls to the switch and automatically transmit unique identity code information which, if recognized, opens an audio circuit and connects an available output telephone line. The individual can then place a telephone call to third party and all audio transmission over the radio link will be scrambled. Scrambled audio signals received at the switch are descrambled and passed to the third party. Audio signals received at the switch from the third party are scrambled and transmitted to the individual whose instrument descrambles the signal.

16 Claims, 2 Drawing Sheets

SECURE COMMUNICATION SYSTEM

BACKGROUND OF THE INVENTION

FIELD OF THE INVENTION

The present invention relates to communication systems, and more particularly, systems intended to assure secure communications through radio links.

A continuing problem with telephone systems that employ a radio link, such as cellular systems or radiotelephone, is the danger of unauthorized interceptions of telephone conversations. Because the radio links that are used by the telephones can be received on virtually any receiver that is tuned to the radio frequencies which are utilized for such transmissions, there can be no realistic expectation of privacy.

Conversations conducted over regular telephone land lines, including those with microwave links, are usually clothed with a reasonable expectation of privacy and therefore such conversations frequently include privileged information without risk of the loss of such privilege. Unfortunately, this expectation is not a reasonable one where radio links are involved. For example, a telephone conversation between attorney and client, doctor and patient, priest and penitent or husband and wife, which would normally be privileged, may lose the privileged status if one or both of the parties uses a cellular telephone or other telephone with a radio link.

It has long been known that telephone conversations containing extremely sensitive information can be protected against eavesdropping or other surveillance by the use of encryption or scrambling. The terms "encryption" and "scrambling" as used herein refer generally to the process of converting "clear" or readily perceivable information, whether speech, tones or other modes of information transmission to something that is guarded or secret or not readily interpreted as meaningful information. "Encoding" is another term that has been used for the process. This is primarily a defense against intentional attempts to intercept telephone conversations or other information that is transmitted over telephone circuits. However, because of the ease of interception through the use of readily available radio receivers, otherwise illegal methods are not necessary to eavesdrop and intercept communications that are erroneously considered "safe".

Generally, the installation of voice "scrambling" or encrypting equipment at each mobile or cellular telephone that is to be involved in a sensitive communication will solve the problem. This approach, however, requires that similar equipment be installed at each participating instrument. A mobile telephone system may install a scrambler at the base station and at each of the mobile units to protect the transmissions of the system.

If a caller has sensitive telephone conversations with several different parties, it will be necessary to install similar scrambling equipment at the telephones of each of the parties. However, there are situations where it is not possible to install scrambling units at every telephone that may become party to a privileged or otherwise sensitive conversation. For example, sensitive financial information may be the subject of telephone conversations involving many different parties, as may be conversations involving trade secrets or other knowledge that should not be intercepted or overheard by persons not authorized to have access to such information.

Accordingly, there may be situations where both ends of a conversation cannot be provided with suitably matched scrambling-descrambling devices. This usually occurs in those situations where access to both instruments is neither convenient nor, in some cases, possible. In most circumstances, even if a scrambler has been installed on a cellular phone, more likely than not, the called party will not have a compatible scrambler-descrambler and the conversation would have to be without protection.

The problem has been addressed in the context of a mobile phone system and the patents to Talbot, U.S. Pat. Nos. 4,441,017, and 4,555,805, describe a communications system including a central station and a plurality of remote stations in which transmissions can either be clear (unenciphered) or secure (enciphered). The various remote stations each have a unique code which is used to encipher messages to and from that station. There is also a provision for a common code that can be used with all remote stations.

The Talbot system is generally useful with a mobile communication system that is under common control and in which communication is usually between the remote stations and the base or between individual remote stations. There is no suggestion in Talbot that the system be extended to the commercial telephone systems or that the base station be linked to a telephone switching facility.

The patent to LoPinto, U.S. Pat. No. 4,549,308, teaches an encryption key for use with cellular phones, which changes each time the carrier frequency is changed, as when a celluar subscriber leaves one cell and enters another. A key is generated from a combination which includes a non broadcast code identifier for a particular telephone. Manipulation of these and other numbers generated in the system result in an encryption key which can be used to control the creation of encryption codes which change depending upon the cell in which transmission and reception takes place.

The patent to Tobias, Jr. et al, U.S. Pat. No. 4,972,479, is directed at a system which does not require a scrambler-descrambler at each called party location. Rather, a base module with a call diverter connected to the public switched telephone network through two standard telephone lines. A bypass interface circuit includes a scrambler/descrambler which can be selectively inserted between the two lines. Under control of the calling party, the base module alternatively includes or excludes the scrambler/descrambler so that the calling party can choose as between a secure and a clear message to the base module. All voice traffic between the base module and the called party takes place over standard telephone lines and is "clear" or "descrambled".

In an alternative embodiment, Tobias, Jr. et al teach that a first base module in one geographic region can communicate with a second base module in a second geographic region using scrambler/descrambler units at each so that all long distance communication is secure. This is to insure that the microwave and radio links of the telecommunications company, which may be susceptible to eavesdropping, can be made secure by encryption or scrambling of the conversations that use the long distance services.

SUMMARY OF THE INVENTION

What is needed and what is provided by the present invention is an improved system which can assure secure conversations over cellular telephones which can be made accessible to the general public. It is not enough that a remote switching facility exist.

According to the present invention, a service is provided that includes a telephone switch system that is provided with a scrambler-descrambler, which, unlike Tobias, Jr. et al (supra) is always connected in the circuit. The telephone switch system has a plurality of lines that are provided by the local telephone company. Subscribers to the service are supplied with scrambler-descrambler units that are compatible with the scrambler-descrambler located at the telephone switch system. Each subscriber has a unique code identifier that is an integral part of either the telephone unit or the scrambler-descrambler. A list of subscribers' code identifiers is maintained at the switch system for verification that a caller is a current subscriber in good standing.

When a subscriber wishes to make a secure telephone call using cellular equipment, the scrambler circuits are automatically enabled and the telephone switch is called using conventional DTMF tone signals. Initially, the voice or audio channels are blocked or disabled in both directions. When the connection is completed, the switch requests the identifier code which is transmitted in encoded or encrypted form. If the subscriber information is maintained in an alphanumeric format which is machine readable, a for example, in ASCII characters, various cryptographic techniques are available to maintain security. The switch initiates a synchronizing signal which is matched by a synchronizing signal from the calling party.

At the same time, the identifier code is decoded and compared to the list of subscribers' valid identifiers. If the unique code identifier is recognized as a valid subscriber's signal, a signal is transmitted to enable or release the audio circuits and a request is made for the telephone number of a party to whom a call is to be completed. The switch then connects a second line from the telephone system, enabling the subscriber to place a call to the intended recipient. When the call is connected, the subscriber's audio conversation is scrambled at the source and descrambled at the switch.

A clear audio conversation is then transmitted over the commercial telephone circuits to the called party. Audio traffic from the called party is then scrambled at the switch and transmitted through the cellular link to the subscriber. The scrambler-descrambler at the subscriber's instrument then descrambles the received audio signals into a coherent conversation.

In short, the audio signals on the cellular link and the confidential subscriber code are encoded or scrambled. The voice transmission through the conventional telephone lines is unscrambled or "clear". The only information being transmitted over the cellular link is the telephone number of the switch and the telephone number of the called party, once the subscriber is recognized.

Accordingly, it is an object of the present invention to assure privacy for the users of telephones with a radio link that is susceptible to eavesdropping or unauthorized interception.

It is an additional object of invention to provide a system that maintains the unique subscriber identifier secure by transmitting such information as an encrypted or encoded signal which is decrypted or decoded at a central station for comparison with a stored database of valid subscriber identifiers.

It is yet an additional object of the invention to provide a system that encodes or scrambles all subscriber audio transmission over radio links, thereby assuring privacy of conversations.

It is a further object of the invention to automatically exchange synchronizing signals once a subscriber has been recognized and before any connection is made to a third, destination location.

It is a further object of the invention to provide a service from a central switch that enables a mobile subscriber that uses a radio link to place clear third party calls though the central switch while maintaining all traffic through the radio link in a secure mode.

Yet another object of the invention is to provide for the automatic transmission of a unique identifier signal in encoded form so that it cannot be intercepted and later used by unauthorized users of voice privacy system.

The novel features which are characteristic of the invention, both as to structure and method of operation thereof, together with further objects and advantages thereof, will be understood from the following description, considered in connection with the accompanying drawings, in which the preferred embodiment of the invention is illustrated by way of example. It is to be expressly understood, however, that the drawings are for the purpose of illustration and description only, and they are not intended as a definition of the limits of the invention.

DESCRIPTION OF THE PREFERRED EMBODIMENTS

Figure 1:
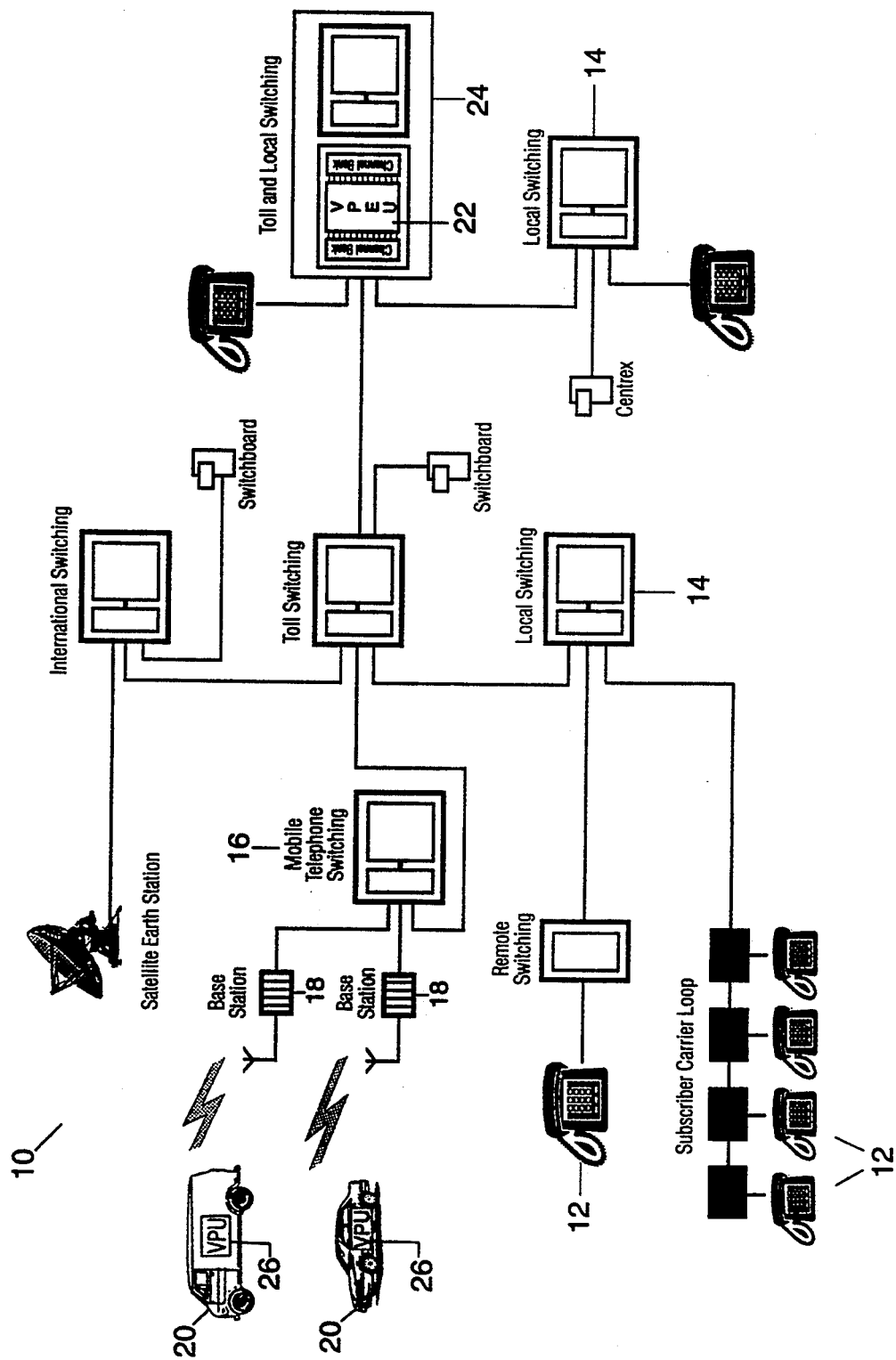
FIG. 1 is a block diagram of a typical system that would employ the method and apparatus of the present invention.

Turning first to FIG. 1, there is shown in block diagrammatic form, a typical communication system 10 including both wire and wireless links between subscribers. As shown, there are individual subscriber's phones 12 which are wired to local switching stations 14. A mobile telephone switching station 16 is connected to cellular telephone base stations 18 which are in radio communication with individual mobile telephones 20.

According to the present invention, a Voice Privacy Exchange Unit ("VPEU") 22 is connected to a switching center 24 that has access to a plurality of telephone lines which can be used for incoming and outgoing calls. Typically, such a unit will have enough lines so that each incoming call can be connected to a separate line for an outgoing call.

Individual mobile telephone users have a Voice Privacy Unit ("VPU") 26 attached to their telephone 20 for scrambling outgoing calls and for descrambling incoming calls. It is obvious that two users of mobile telephones 20 that are each equipped with a VPU 26 may contact each other and conduct secure conversations without the need for the present invention. It is the individual mobile user that wishes to communicate with a telephone 12 not equipped with a VPU 26 that benefits from the present invention.

In operation, a mobile telephone 20 equipped with a VPU 26 initiates a call to the VPEU 22 utilizing the base station 18 and the mobile switching station 16. The call is routed through telephone system 10 until it is connected to the switch center 24 in which the VPEU 22 is installed. The VPEU 26 initiates a request for a subscriber identification code over the telephone connection and the telephone 20 and/or the VPU 26 automatically responds with an encoded signal containing the subscriber identification.

Assuming that the subscriber identification is recognized as valid, synchronizing signals are exchanged and a second, outgoing telephone line is connected to the incoming line. The user of the phone 20 is then invited to "dial" a destination through the telephone system 10. All audio frequency transmissions over the radio link between the VPU 26 and the VPEU 22 are then scrambled. Outgoing audio from the mobile phone 20 is scrambled by the VPU 26 and unscrambled by the VPEU 22. Similarly, audio received by the VPEU 22 from the called party is scrambled and transmitted to the VPU 26 where it is unscrambled for the calling party.

As a result, all audio traffic over the radio link is scrambled. However, the parties to the conversation receive unscrambled audio as though the scrambling equipment were not in place. Since the concern of the present invention is only the otherwise readily accessible radio link, the security of the telephone lines is not a problem addressed by the present invention.

Figure 2:
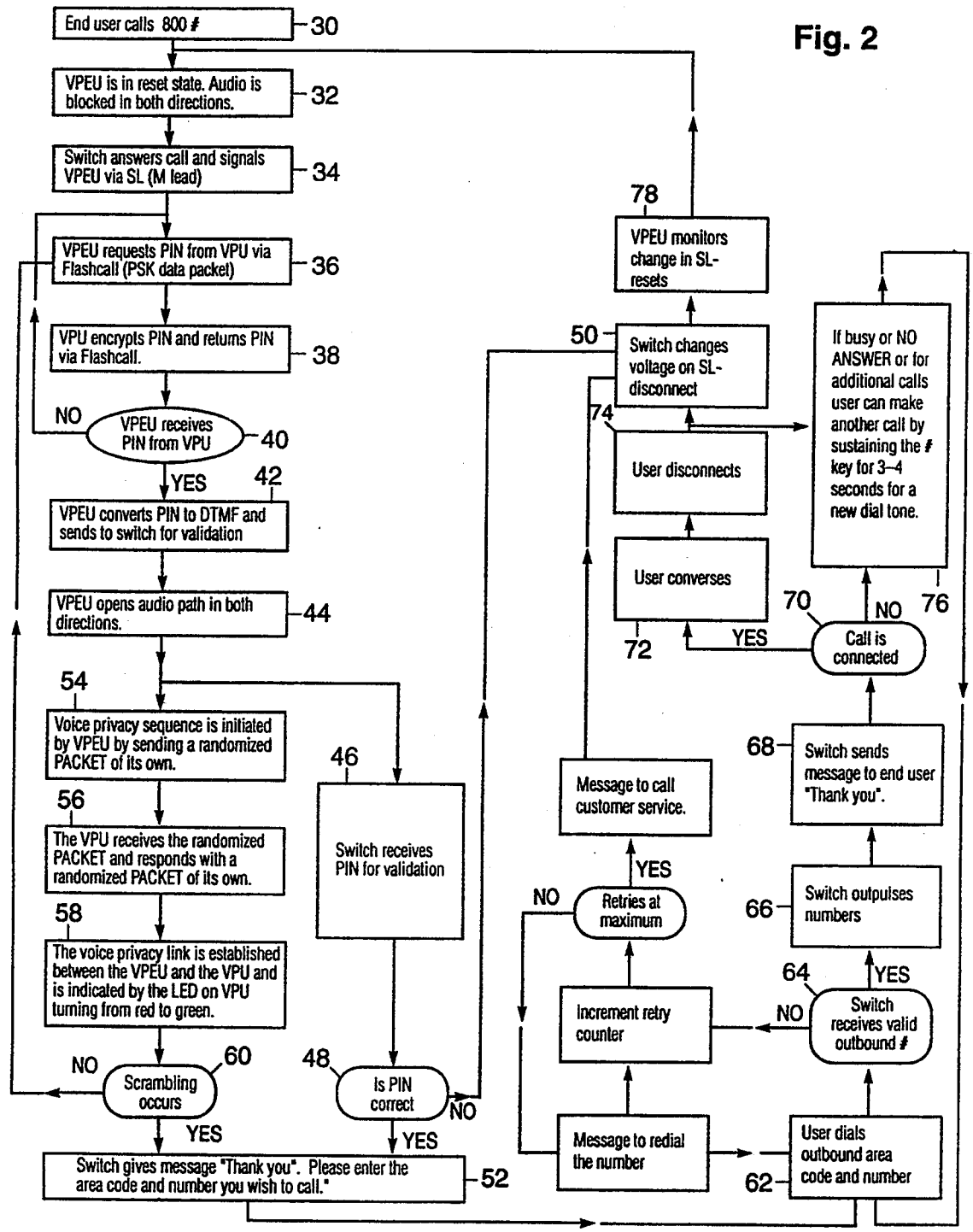
FIG. 2 is a flow diagram of the operation of a system according to the present invention.

Turning next to FIG. 2, there is shown a flow chart which explains, in detail, the operation of the system of the present invention. Each block of the flow chart will be numbered and its purpose discussed.

Call Initiation 30

The process is initiated by a call to the telephone number of the switching center 24 containing the VPEU 22.

Quiescent State 32

The VPEU 22 is reset and audio circuits are disabled or blocked in all directions.

Response 34

Switching center 24 "answers" the call and completes the call circuit. A signal to the VPEU 22 announces the receipt of a call.

Code Request 36

The VPEU 22 sends a signal requesting an identifying code from the calling party.

Code Reply 38

The VPU 26 and or telephone 20 encrypt a distinctive subscriber code and transmit this code to the switching center 24.

Code Receipt 40

If a code is not received after a predetermined time interval, a signal goes to the Code Request 36 and the request is repeated.

Code Decryption 42

The received code is decrypted by VPEU 22 and is sent to a database at the switching center 24 where it can be recognized if it is a valid code.

Audio Path Enabling 44

The VPEU 22 unlocks or opens the audio path for traffic both in and out of the VPEU 22.

BRANCH I

Code Receipt 46

In the first branch, the switching center 24 receives the decrypted code and sends it for validation.

Validation 48

The decrypted code is compared to a database of valid codes and, if not recognized, a signal is sent to terminate the call. If the code is valid, a signal is sent to enable connection to a called party.

Call Termination 50

Upon receipt of a signal that the transmitted code is not a valid one, the call is terminated and the calling party is disconnected from the switch center 24.

Call Continue 52

If the code is valid, this branch partially enables the placing of a call to a called party.

BRANCH II

Initiate privacy 54

VPEU 22 sends a randomized signal packet to the VPU 26.

Privacy Response 56

VPU 22 responds to the randomized signal packet by sending a return randomized signal packet to the VPEU 26.

Link Establishment 58

Receipt of the return signal by the VPEU 26 enables the creation of a scrambling protocol and the privacy link is established.

Scrambling Initiated 60

If scrambling fails a signal is sent to Code Request 36 and the process repeats from that point. If scrambling is initiated, a second enabling signal is sent to Call Continue which sends a message to the user requesting that a call be placed on an outgoing line which has been coupled into the circuit by the switch.

Call Placement 62

The calling party, utilizing his key pad, dials the number of a party to be called.

Call Validation 64

If the dialed number is valid, enable transmission of the number.

Transmit Dialed Numbers 66

The number is transmitted by the switching center 24.

Hand off 68

The switch sends message prescribed to subscriber.

Connection With Called Party 70

Branch if Yes

Conversation Ensues 72

The called party responds and the conversation takes place.

Call Terminates 74

Conversation ends and call disconnected.

At this point, Call Termination 50 can be invoked or the process can proceed to the Branch if No path.

Branch if No

Remain With Switch 76

If the called party is busy, there is no answer, or, after a call is complete, the user wishes to place another call, by using a predetermined key, a new dial tone is provided on the outgoing line. The process returns to Call Placement 62.

Reset 78

Once the calling party is finished with the system, the calling party disconnects. The disconnect is recognized by the switch 24 and a reset signal is sent to the VPEU 22 so that it is available to receive the next call on the line.

To recapitulate, a system has been shown which ensures that a telephone system including a radio link that is easily intercepted, can be made safer by the use of an encryption or scrambling system that does not require any special equipment at the telephone of a called party. A switch with a scrambler-descrambler unit can be called by a subscriber using a scrambler-descrambler. The switch provides the user with a wire link to a called party.

All audio conversations that are transmitted over the radio link are either scrambled by the user and descrambled at the switch or scrambled at the switch and descrambled by the user. Even though telephone companies may use microwave links, such traffic usually involves a plurality of conversations which are multiplexed before transmission so that the interception of such signals rarely enables a particular conversation to be captured.

The system and process discussed herein includes the automatic transmission in secure form of a distinguishing identifier which can enable recognition of the caller as one who is authorized to use the service. All audio circuits are disabled or blocked until the caller is recognized. The scrambler circuits are automatically synchronized by the transmission of a first random signal packet to the caller and the return of a second random signal packet from the caller.

Moreover, no bypass circuits are required in that the system is only invoked by users such as cellular telephone subscribers who do not wish to participate in unscrambled conversations that are susceptible to interception. Accordingly, for the purposes of the present invention, the voice privacy unit may be deemed as an integral element of the user's calling instrument and the voice privacy exchange unit is an integral part of the switch which connects a received call to a second, outgoing line that is connected to the telephone system.

What is claimed is:

1. A process to automatically identify a caller and allow secure communication while employ a wireless link comprising the steps of:
   a. initiating a wireless call between a calling party and a multiple line input, multiple line output telephone exchange whose voice circuits are obstructed;
   b. sending a validating inquiry from said exchange to said calling party;
   c. returning a validating reply from said calling party to said exchange;
   d. sending a first scrambling synchronizing signal from said exchange to said calling party;
   e. returning a second scrambling synchronizing signal from said calling party to said exchange to establish a scrambling protocol;
   f. unobstructing said exchange voice circuits;
   whereby all voice information exchanged between said calling party and said exchange is scrambled according to the scrambling protocol and therefore secure, and voice information exchanged between said exchange and a called party is unscrambled.

2. The process of claim 1, further including the step of transmitting a destination code from said calling party to said exchange for initiating communication with a third party.

3. The process of claim 2, further including the step of initiating a call to a called party corresponding to the received destination code over a secure communication link between said exchange and the called party.

4. The process of claim 3, further including the step of scrambling all voice communications between said calling party and said exchange.

5. The process of claim 4, further including the step of descrambling received voice communications from said calling party at said exchange and transmitting unscrambled voice communications between said exchange and the called party, whereby all wireless voice communication between the calling party and the exchange is scrambled and all communication between the exchange and the called party is unscrambled.

6. The process of claim 3 further including the step of scrambling all voice communication from said called party before transmission to said calling party.

7. The process of claim 6 further including the step of scrambling all voice communication received by said calling party.

8. A process to assure secure communication while employing a wireless link comprising the steps of:
   a. Initiating a wireless call between a calling party and a multiple line input, multiple line output telephone exchange whose audio circuits are obstructed;
   b. transmitting an encoded inquiry from said exchange to said calling party;
   c. transmitting a first randomized signal combination from said exchange to said calling party in response to said inquiry;
   d. transmitting a second randomized signal combination from said calling party to said exchange in response to said first randomized signal combination;
   e. transmitting an identifying signal combination from said calling party to said exchange for opening the audio channel for further transmissions over the wireless link in scrambled form; and
   f. transmitting the telephone number identity of a party to be called from said calling party to said exchange to cause said exchange to communicate with the called party over a telephone company link.

9. The process of claim 8, further including the step of initiating a call to a called party whose telephone number identity was transmitted to said exchange.

10. The process of claim 9, further including the step of scrambling all audio communications between said calling party and said exchange.

11. The process of claim 10, further including the step of audio unscrambling communications received at said exchange from said calling party and transmitting audio unscrambled communications between said exchange and the called party, whereby all wireless audio communication between the calling party and the exchange is scrambled and all communication between the exchange and the called party is unscrambled.

12. The process of claim 10 further including the step of scrambling all audio communication from said called party at said exchange before transmission to said calling party.

13. The process of claim 12 further including the step of decrypting all audio communication by received said calling party.

14. A process to assure secure communication while employing a wireless link comprising the steps of:
   a. Initiating a wireless call between a calling party and a multiple line input, multiple line output telephone exchange whose audio circuits are disabled;
   b. transmitting an inquiry from said exchange to said calling party;
   c. transmitting a first randomized signal combination from said exchange to said calling party in response to said inquiry;

d. transmitting a second randomized signal combination from said calling party to said exchange in response to said first randomized signal combination;

e. transmitting an identifying signal combination from said calling party to said exchange for enabling the audio channel for further transmissions over the wireless link in scrambled form;

f. transmitting the telephone number of a party to be called from said calling party to said exchange to cause said exchange to communicate with the called party over a telephone company link, and g. scrambling the audio transmission from said calling party to said exchange.

15. The process of claim 14, further including the step of initiating a call to a called party whose telephone number was transmitted to said exchange.

16. The process of claim 14, further including the step of unscrambling audio communications received at said exchange from said calling party and transmitting scrambled audio communications between said exchange and the called party, whereby all wireless audio communication between the calling party and the exchange is scrambled and all communication between the exchange and the called party is unscrambled.

* * * * *